United States Patent [19]

Gollbach

[11] Patent Number: 4,764,828

[45] Date of Patent: Aug. 16, 1988

[54] DISC AND HUB CENTERING DEVICE FOR USE IN MAGNETIC DISC DRIVES

[75] Inventor: Lawrence W. Gollbach, Felton, Calif.

[73] Assignee: Priam Corporation, San Jose, Calif.

[21] Appl. No.: 31,306

[22] Filed: Mar. 26, 1987

[51] Int. Cl.[4] .............................. G11B 17/02
[52] U.S. Cl. ....................... 360/98; 360/135
[58] Field of Search ............ 360/97, 98, 99, 133, 360/135

[56] References Cited

U.S. PATENT DOCUMENTS 4,315,288  2/1982  Bernett et al. .................. 360/98
4,683,505  7/1987  Schmidt et al. ................. 360/98

Primary Examiner—Robert S. Tupper
Attorney, Agent, or Firm—Flehr, Hohbach, Test, Albritton & Herbert

[57] ABSTRACT

Each spacer separating adjacent discs in a magnetic disc drive includes an insert having a body portion having a height equal to the height of the spacer and with a plurality of finger portions extending from the body portion less than one-half the thickness of a disc, the finger portions separating a disc from the hub and permitting movement of a disc relative to the hub during temperature cycling. Each insert further includes a plurality of cavities in the body portion in association with the finger portions for accommodating a finger which might be folded during assembly of the discs on the hub.

7 Claims, 2 Drawing Sheets

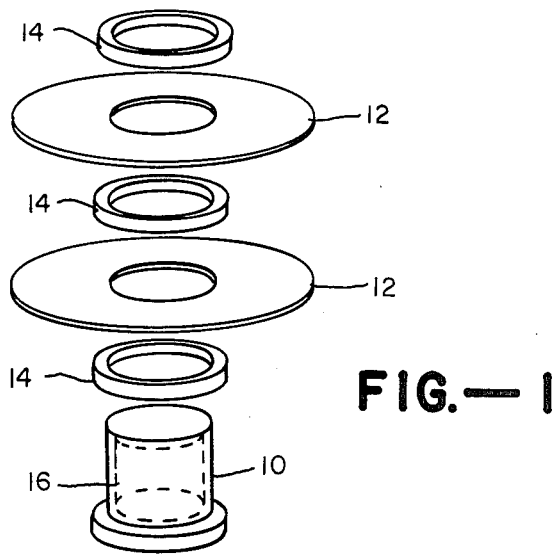
FIG.—1
DIRECTION OF SLIP
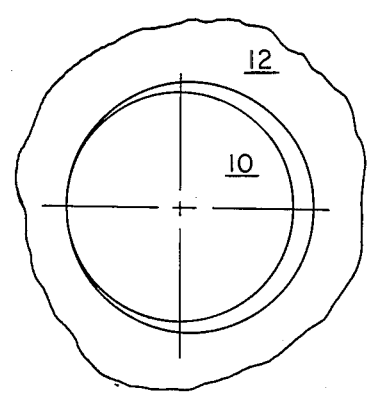
FIG.—2A
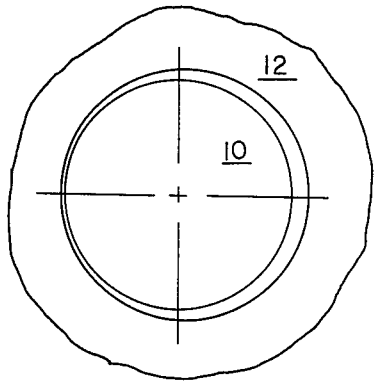
FIG.—2B
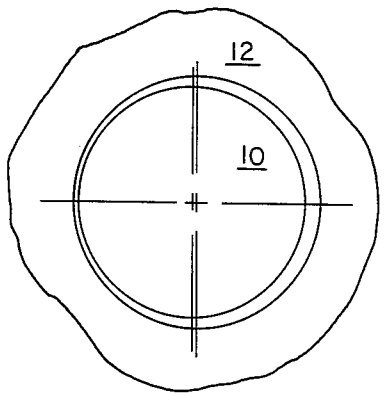
FIG.—2C
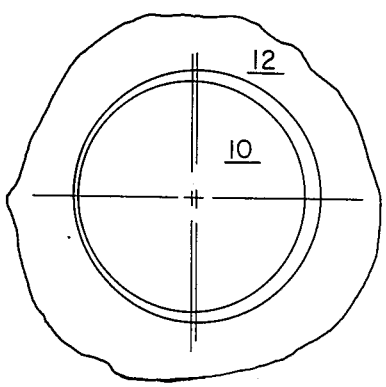
FIG.—2D

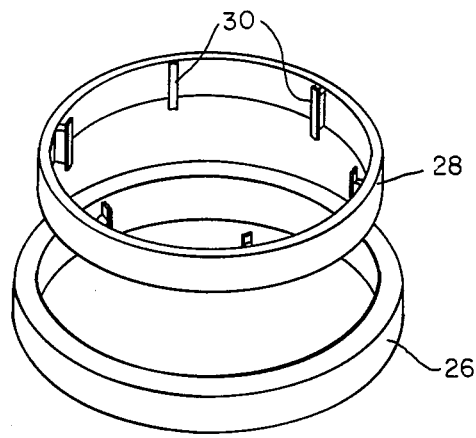
FIG.—3
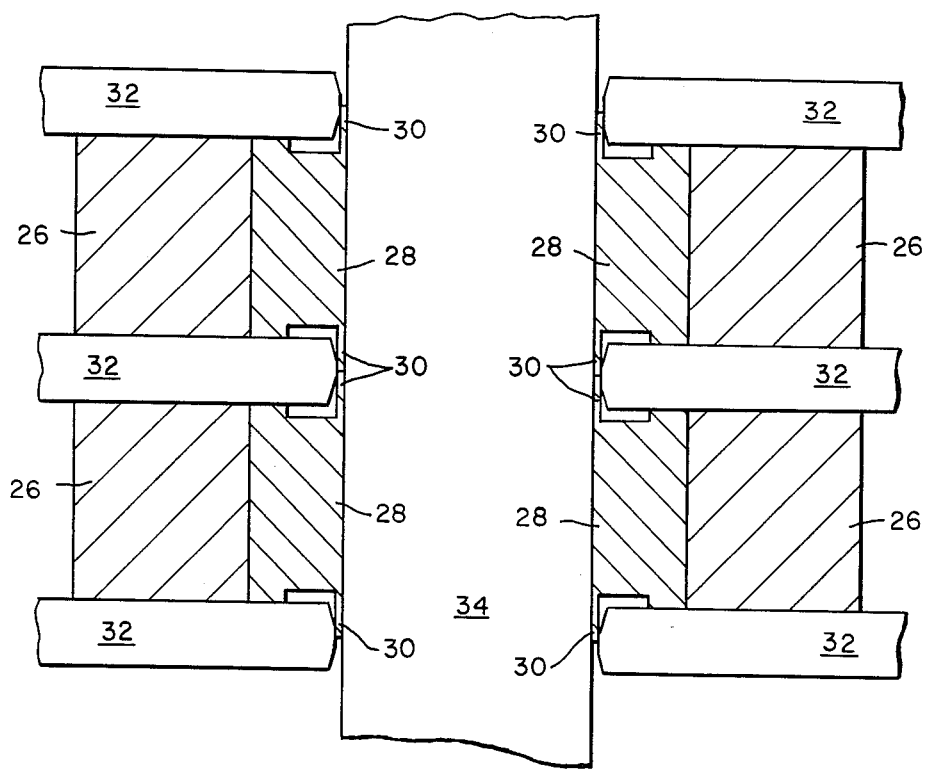
FIG.—4

DISC AND HUB CENTERING DEVICE FOR USE IN MAGNETIC DISC DRIVES

BACKGROUND OF THE INVENTION

This invention relates generally to magnetic disc drives, and more particularly the invention relates to the mounting of magnetic recording discs on a rotatable hub.

A disc drive for magnetically recording data comprises a plurality of discs mounted in spaced relationship on a rotatable hub. As the discs are rotated on the hub, pickup heads move across the disc surfaces for recording or reading digital data on concentric tracks in magnetic film on the disc surfaces.

To reduce the overall size of disc drives, the spindle motors for rotating the hubs have been positioned within the hub rather than external thereto. This has necessitated the use of ferromagnetic steel as the hub material to provide the magnetic return path and insulation between the spindle motor and the recording discs. Since the discs are glass or aluminum, alignment problems can arise when the disc drive is temperature-cycled. For example, shipping specifications call for temperatures down to −40° C., causing the discs to shrink at different rates and magnitudes than the hub and creating interference between the discs and the hub. The interference can result in a slippage of the discs on the hub and introduce a new center of rotation for the discs. This, in turn, introduces off-track errors in recorded data.

Heretofore, attempts at eliminating disc slippage due to temperature cycling have included reducing the diameter of the hub and the application of strips of Teflon tape in parallel axial alignment and radially spaced on the surface of the hub. The tape is supposed to center the discs adequately yet be compliant as the discs move relative to the hub. However, this method has the disadvantages of difficult and time-consuming assembly as well as reliability concerns if the discs peel the tape at the top of the hub. Further, contamination can become a problem since the discs slide down the entire length of the tape during assembly.

SUMMARY OF THE INVENTION

An object of the invention is an improved device for centering discs on a disc drive hub and maintaining disc radial alignment on the hub when temperature-cycled.

A feature of the invention is a disc spacer ring insert having centering fingers for use in aligning discs.

Another feature of the invention is a spacer ring insert having a cavity for receiving a centering finger in the event that a finger is folded back during assembly of a disc on a spindle.

The invention and objects and features thereof will be more readily apparent from the following detailed description and appended claims when taken with the drawing.

BRIEF DESCRIPTION OF THE DRAWING

FIG. 1 is an exploded isometric view of a hub and disc assembly for a magnetic disc drive.

FIGS. 2A-2D illustrate disc slippage on a hub due to temperature cycling.

FIG. 3 is an exploded isometric view of a disc spacer ring and a spacer ring insert in accordance with one embodiment of the invention.

FIG. 4 is a side view in section of discs assembled on a hub using the spacer ring and insert of FIG. 3.

DETAILED DESCRIPTION OF ILLUSTRATIVE EMBODIMENT

FIG. 1 is an exploded isometric view of a hub 10 and a disc assembly for a magnetic disc drive. As shown in this embodiment, two discs 12 are mounted on the hub 10 with spacers 14 provided between discs to facilitate the movement of pickup heads between the discs. As noted above, the spindle motor for driving the hub 10 and the discs mounted thereon is now being positioned within the hub 10 as illustrated by the dotted lines at 16. Accordingly, the hub 10 must be made of a ferro-magnetic material such as steel to provide the flux return path and to facilitate magnetic isolation between the spindle motor and the recording discs.

As noted above, alignment of the discs on the hub can become a problem when the disc drive is temperature-cycled. This is illustrated schematically in FIGS. 2A–2D. FIG. 2A illustrates a disc 12 as originally assembled on a hub 10. The recording tracks for data on the disc 12 are defined by the axis of rotation of the disc on the hub as assembled.

When the disc stack is temperature-cycled to −40° C., according to shipping specifications, the disc will shrink at different rates and magnitudes relative to the hub, causing an interference as shown in FIG. 2B. The resulting interference causes a slippage of a disc on the hub as indicated by the arrow. The slippage of the disc changes the axis of rotation for the disc as illustrated in FIG. 2C and FIG. 2D of the hub and disc after slippage when cold and at ambient temperature, respectively. The new axis of rotation can cause off-track errors in reading and recording data.

FIG. 3 is an exploded isometric view of a spacer ring 26 and a spacer ring insert 28 in accordance with one embodiment of the invention. The insert 28 has an outside diameter no greater than the inside diameter of the spacer ring 26 so that the insert can be mounted within the spacer ring. The insert is preferably made of a compliant material such as injection-molded plastic. The insert includes a plurality of centering fingers 30 which extend above and below the spacer ring insert for positioning between a spindle hub and a disc. This is illustrated in the side view in section of FIG. 4 in which a plurality of discs 32 mounted on a hub 34 with the spacer ring 26 and spacer ring insert 28 separating the discs. The centering fingers 30 of the insert are positioned between the disc and the spindle and extend to more than halfway across the thickness of a disc. Accordingly, the centering fingers 30 center the discs on the hub and are compliant to allow the discs to move relative to the hub during temperature cycling.

In accordance with another feature of the invention, the inserts 28 are provided with cavities 38 should a finger get folded back during assembly of a disc.

The depth of the fingers is less than half of a disc thickness, thereby ensuring that orientation of one disc spacer is independent of other spacers. An advantage of using the spacer ring insert in accordance with the invention is that balancing operations may not be needed due to the symmetry of the insert.

Use of spacer ring inserts in accordance with the invention facilitates the maintenance of radial alignment of a disc on a hub during temperature cycling. The insert is readily manufactured and easily assembled in the disc drive. While the invention has been described with reference to a specific embodiment, the description is illustrative of the invention and not to be construed as limiting the invention. Various modifications and applications may occur to those skilled in the art without departing from the true spirit and scope of the invention as defined by the appended claims.

What is claimed is:

1. For use with a disc spacer in mounting a magnetic disc on a rotating hub in a disc drive, an insert for the spacer comprising
    a body portion having a height equal to the height of the spacer, and
    a plurality of finger portions extending above the height of the body portion less than one-half the thickness of a disc, said finger portions separating a disc from the hub and permitting movement of a disc relative to the hub during temperature cycling.

2. The insert as defined by claim 1 and further including a plurality of cavities in said body portion in association with said finger portions for accommodating folded finger.

3. The insert as defined by claim 2 and further including a plurality of finger portions extending from said body portion below the height of the body portion less than one-half the thickness of a disc.

4. The insert as defined by claim 3 wherein said body portion and said plurality of finger portions are formed of injection-molded plastic.

5. In a disc drive assembly, the combination comprising
    a hub,
    a plurality of discs assembled on said hub,
    a spacer ring between adjacent discs, and
    an insert in each spacer ring including
        a body portion having a height equal to the height of the spacer, and
        a first plurality of finger portions extending from said body portion above the height of the body portion less than one-half of the thickness of a disc,
        a second plurality of finger portions extending from said body portion below the height of the body portion less than one-half of the thickness of a disc,
        said finger portions separating the disc from the hub and permitting movement of a disc relative to said hub during temperature cycling.

6. The combination as defined by claim 5 wherein each of said inserts further includes a plurality of cavities in said body portion in association with said finger portions for accommodating a folder finger portion.

7. The combination as defined by claim 6 wherein said insert is formed from injection-molded plastic.

* * * * *